(12) United States Patent
Loessl et al.

(10) Patent No.: US 11,064,659 B2
(45) Date of Patent: Jul. 20, 2021

(54) DEVICE AND METHOD FOR CULTIVATING PLANTS, AND SOWING AND PLANTING MAT THEREFOR

(71) Applicant: Agrilution GmbH, Munich (DE)

(72) Inventors: Maximilian Loessl, Munich (DE); Philipp Wagner, Fuerstenfeldbruck (DE)

(73) Assignee: Agrilution Systems GmbH, Munich (DE)

( * ) Notice: Subject to any disclaimer, the term of this patent is extended or adjusted under 35 U.S.C. 154(b) by 429 days.

(21) Appl. No.: 15/769,453

(22) PCT Filed: Oct. 21, 2016

(86) PCT No.: PCT/EP2016/075436
§ 371 (c)(1),
(2) Date: Apr. 19, 2018

(87) PCT Pub. No.: WO2017/068150
PCT Pub. Date: Apr. 27, 2017

(65) Prior Publication Data
US 2018/0317400 A1   Nov. 8, 2018

(30) Foreign Application Priority Data

Oct. 22, 2015 (DE) ..................... 10 2015 118 059.6

(51) Int. Cl.
*A01G 9/20*   (2006.01)
*A01G 9/00*   (2018.01)
(Continued)

(52) U.S. Cl.
CPC .............. *A01G 9/20* (2013.01); *A01G 7/045* (2013.01); *A01G 9/00* (2013.01); *A01G 24/44* (2018.02); *A01G 27/003* (2013.01)

(58) Field of Classification Search
CPC . A01G 9/20; A01G 9/00; A01G 24/44; A01G 27/003; A01G 7/045; A01G 9/14;
(Continued)

(56) References Cited

U.S. PATENT DOCUMENTS 2,928,211 A * 3/1960 Martin ................... A01G 31/06
47/60
5,636,474 A * 6/1997 Lo .......................... A01G 31/02
47/61
(Continued)

FOREIGN PATENT DOCUMENTS

JP       S51-7746       7/1977
JP       2004-121074    4/2004
(Continued)

OTHER PUBLICATIONS

Japanese Office Action, dated Jul. 2, 2019, in Japanese Patent Application No. JP2018-521310 and its English translation.
(Continued)

*Primary Examiner* — Trinh T Nguyen
(74) *Attorney, Agent, or Firm* — Barnes & Thornburg LLP; Jeffrey R. Stone

(57) ABSTRACT

A device for cultivating plants is provided, comprising a watering device, an illuminating device, one or more seed mats, and a control unit configured to control the watering device and the illuminating device by means of a program controller, wherein the program controller comprises watering data and illuminating data which is individually matched to the one or more seed mats.

20 Claims, 7 Drawing Sheets

(51) Int. Cl.
*A01G 24/44* (2018.01)
*A01G 7/04* (2006.01)
*A01G 27/00* (2006.01)

(58) Field of Classification Search
CPC ... A01G 9/16; A01G 9/18; A01G 9/24; A01G 9/246; A01G 9/247; A01G 9/26; A01G 9/249; A01G 27/001; A01G 27/005; A01G 27/008; A01G 27/02; A01G 2031/006; A01G 31/02; A01G 31/06; A01C 1/02; A01C 1/044
See application file for complete search history.

(56) References Cited

U.S. PATENT DOCUMENTS

| | | | | |
|---|---|---|---|---|
| 8,234,812 | B1* | 8/2012 | Colless | A01G 9/16 47/61 |
| 8,910,419 | B1* | 12/2014 | Oberst | A01G 31/06 47/60 |
| 2003/0101645 | A1* | 6/2003 | Cole | A01G 31/02 47/61 |
| 2014/0020292 | A1* | 1/2014 | Mcnamara | A01G 9/24 47/66.6 |
| 2014/0090295 | A1* | 4/2014 | Fambro | A01G 9/1423 47/62 N |
| 2014/0115958 | A1* | 5/2014 | Helene | A01G 31/06 47/17 |

FOREIGN PATENT DOCUMENTS

| | | |
|---|---|---|
| JP | 2005312384 | 11/2005 |
| JP | 2008167704 | 7/2008 |
| JP | 52-99946 A | 8/2008 |
| JP | 2010075172 | 4/2010 |
| JP | 3176525 | 6/2012 |
| JP | 2013150584 | 8/2013 |
| WO | 2008/136190 | 7/2010 |

OTHER PUBLICATIONS

Office Action issued in Japanese Patent Application No. 2018-521310, dated Apr. 7, 2020 (English translation attached).

* cited by examiner

DEVICE AND METHOD FOR CULTIVATING PLANTS, AND SOWING AND PLANTING MAT THEREFOR

The invention relates to a device and a method for cultivating plants and sowing mats therefor.

PRIOR ART

Until now, smaller plants for household use have mostly been cultivated in stationary greenhouses or plant growing devices and distributed to consumers via commerce.

OBJECT OF THE INVENTION

The object of the invention is to create a device and a method for cultivating plants and seed mats therefor, with which the consumer himself can cultivate and harvest respective desired plants from seeds—even without substantial exposure to daylight, without there being any risk of algae formation.

SOLUTION TO THE OBJECT

This object is solved with the features stated in claim 1. Other advantages of the invention arise from the dependent claims.

In particular, the present invention provides a device for cultivating plants including
a. a watering device (20)
b. an illuminating device (3), which preferably produces LED light
c. a mat on which seeds (2) are arranged and
d. which is penetrable by the roots of said seeds
wherein the mat as a sowing and planting mat (16) has a transmission factor of 0 to 60%, preferably 0 to 50%, more preferably 0 to 40%, further preferably 0 to 30%, even further preferably 0 to 20% and most preferably 0 to 10%.

The transmission factor is measured with a sowing mat having a thickness of 5 mm with illuminant CIE D65 (approximately according to ISO 13468) at five positions of the sowing mat, wherein the five positions for determining the light transmission of the sowing mat are determined as follows:
one position is the centre of the sowing mat;
the other 4 positions are distributed equidistantly (evenly/equally spaced) on a circle around the first position, wherein the radius of this circle is determined to be half the radius of the incircle of the sowing mat (if the sowing mat is round, the incircle is equal to the outer circle);
  the distance of the light source to the sowing mat and of the measuring position to the sowing mat is 10 mm, respectively;
  the median, which represents the transmission factor of the sowing mat, is calculated from the five measurement results.

In the device according to the invention, a mat support (14) is preferably provided, which is formed as a support for at least one sowing mat.

In the device according to the invention, a plurality of, preferably two to four, insert openings (12) are provided, into each of which a mat support (14) may be arranged by means of fitting and/or sliding and/or folding.

According to the invention, the insert openings (12) are preferably arranged in a frame and/or in a panel which preferably are slidably arranged in the device and having corresponding recesses.

According to the invention, the illuminating device (3) is preferably arranged above each frame and/or panel.

According to the invention, the spectral range and/or selected wavelength ranges emitted from the illuminating device (3) are preferably adjustable.

According to the invention, the watering device (20) preferably comprises a watering trough (8), above which the sowing mats (16) are arranged.

According to the invention, the water inlet and/or water outlet (22) is preferably controllable.

According to the invention, the filling level of the watering trough (8) is preferably adjustable by means of the water inlet and/or water outlet (22).

According to the invention, each illuminating device (3) together with the sowing mat (16) arranged below and the watering trough (8) arranged below preferably forms a cultivating unit (6).

According to the invention, the watering trough (8) with at least one sowing and planting mat (16) arranged above is preferably formed as a drawer unit.

According to the invention, the watering device (20) with the inlet and/or outlet (22) of the watering trough (8) is preferably connectable to the lower watering trough edge, preferably by means of a plug-in connector.

According to the invention, at least one illuminating device (3) is preferably formed as a drawer unit including an electrical plug-in connector.

According to the invention, a control unit (7) and/or the watering device (20) and/or the illuminating device (3) and/or a climate control device (5) is preferably controllable by means of an individually adjustable program controller.

According to the invention, the growth progress of the plants growing from the seeds (2) is preferably recorded by at least one camera and the signals are forwarded to the program controller by a pattern detection device and an associated pattern detection memory.

According to the invention, a data memory is preferably provided for the program controller, from which data memory illumination data and/or watering data and/or climate control data matched individually to the seeds (2) may be retrieved, wherein the data memory is preferably provided as an external data memory by means of an internet connection provided within the device.

According to the invention, a program sensor preferably is provided as an RFID sensor and/or QR code sensor and/or barcode sensor, which can record RFID signals and a QR tag and a barcode, respectively, of at least one sowing mat (16) to control the program controller.

Furthermore, the invention provides a sowing and planting mat (16) for a device according to the invention, wherein the individual data of the seeds (2) is transmittable to the program controller and the data memory via an RFID sensor and QR code sensor and barcode sensor, respectively.

Furthermore, the invention provides a sowing and planting mat (16) for a device according to the invention, wherein an RFID chip is preferably provided in a detachable manner in and/or on the sowing mat (16), and/or a QR code and/or a barcode is attached thereto.

Furthermore, the invention provides a sowing and planting mat (16) for a device according to the invention, wherein the sowing mat (16) is separately or integrally stackable with a fertiliser mat (18).

Furthermore, the invention provides a method for cultivating plants in a stationary and/or movable cultivating device, wherein the seeds (2) are deposited on a mat as a sowing and planting mat (16), preferably one of the sowing and planting mats (16) as specified above, wherein the sowing and planting mat has a transmission factor of 0 to 60%, preferably 0 to 50%, more preferably 0 to 40%, further preferably 0 to 30%, even further preferably 0 to 20% and most preferably 0 to 10%.

The transmission factor is measured with a sowing mat having a thickness of 5 mm with illuminant CIE D65 (approximately according to ISO 13468) at five positions of the sowing mat, wherein the five positions for determining the light transmission of the sowing mat are determined as follows:

one position is the centre of the sowing mat;
the other 4 positions are distributed equidistantly (evenly/equally spaced) on a circle around the first position, wherein the radius of this circle is determined to be half the radius of the incircle of the sowing mat (if the sowing mat is round, the incircle is equal to the outer circle);
the distance of the light source to the sowing mat and of the measuring position to the sowing mat is 10 mm, respectively;
the median, which represents the transmission factor of the sowing mat, is calculated from the five measurement results,
and this mat is accommodated into a cultivating device preferably according to one of claims 1 to 17 with at least one illuminating device (3) and/or a watering device (20) and/or a climate control device (5), with which the seeds (2) are stimulated to germinate and grow on the mat, and the respective illumination conditions, watering conditions and climate control conditions are recorded by means of sensors and are monitored and controlled by means of a controller.

Furthermore, the invention relates to a device and a method for cultivating plants and sowing mats therefor, preferably in a mobile cultivating device. The seeds are deposited onto a sowing mat, which preferably has a transmission factor of 0 to 60%, preferably 0 to 50%, more preferably 0 to 40%, further preferably 0 to 30%, even further preferably 0 to 20% and most preferably 0 to 10%. The transmission factor may be measured as described herein. The cultivating device preferably comprises at least one illuminating device, a watering device and a climate control device, which record respective illumination conditions, watering conditions and climate control conditions in a preferred embodiment by means of sensors, and monitors and preferably controls theses conditions by means of a controller in a fully automated manner, so that the seeds are stimulated to germinate and grow on the mat.

The invention is described in more detail below with reference to the attached exemplary drawings. Therein:

The device according to the invention comprises a base, a housing, a climate control device, a watering device, a door optionally including at least one observation opening, at least one cultivating unit comprising a watering trough having an insert opening, and an illuminating device.

Figure 5:
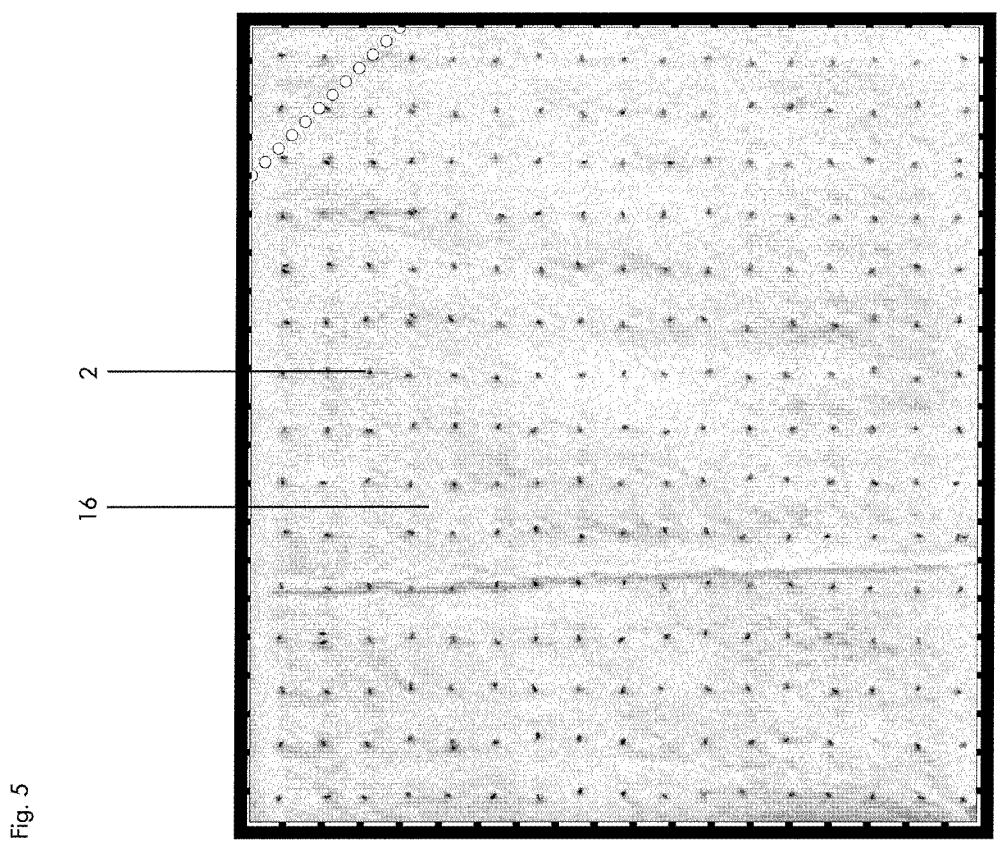
FIG. 5 shows a sowing mat according to the invention in a sowing mat support
Figure 6:
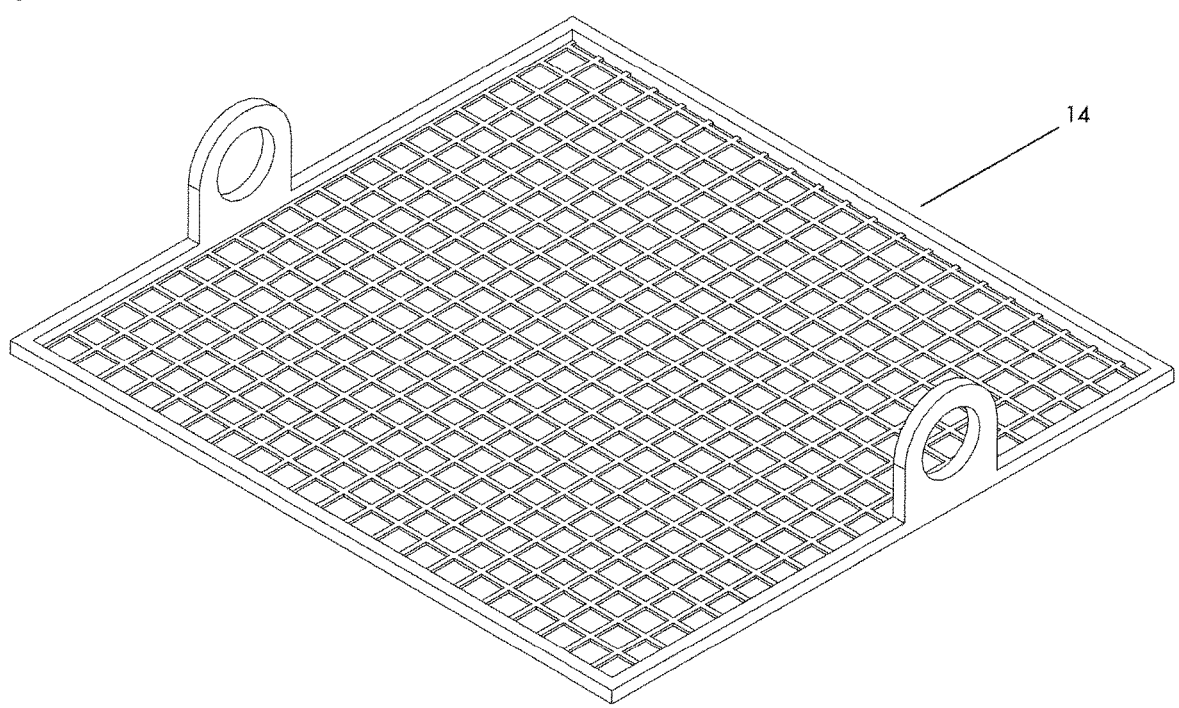
FIG. 6 shows a sowing mat support according to the invention
Figure 7:
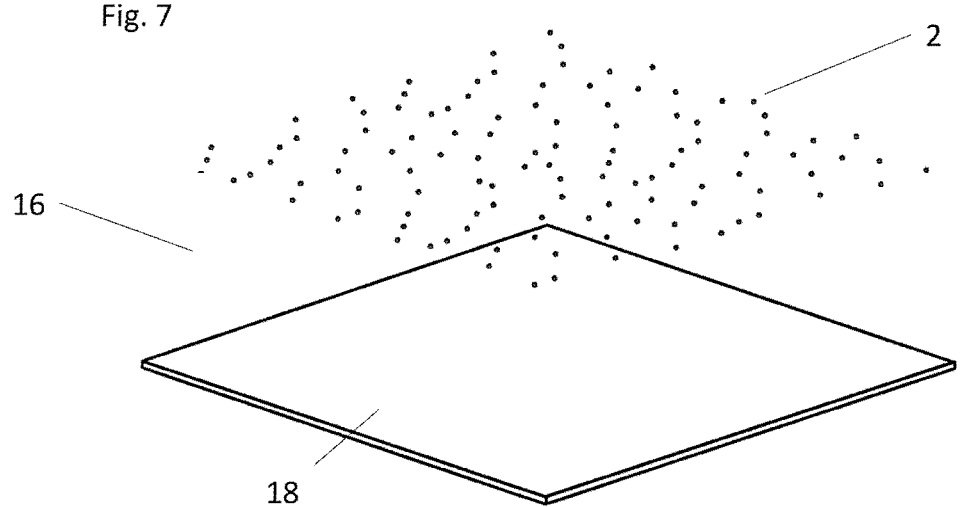
FIG. 7 shows an exploded view of the sowing mat according to the invention According to FIG. 1-4

According to FIG. 5-7

The sowing mat with integrated seeds is separately or integrally stackable with a fertiliser mat. An RFID chip is provided on the sowing mat, preferably in a detachable manner, and/or a QR code and/or a barcode is attached thereto. The individual data of the sowing mat may be transmitted to the program controller and the data memory using the program sensor located in the device, which is preferably designed as an RFID sensor and/or QR code sensor and/or barcode sensor. The data of the sowing mat denotes at least the seeds deposited onto the sowing mat. At least one sowing mat is connectable with a mat support. The mat support is preferably formed in the shape of the sowing mats and has openings for the roots of the plants. Preferably, 4 mat supports are used, but 2 or elongated mat supports may also be used. For the mat support and/or the mat supports, one or more, preferably two to four, insert openings is/are provided.

The housing of the device is made of plastic and/or wood and/or metal. The door of the device is made of plastic and/or wood and/or metal and/or glass. The door of the device may be formed without or with one or several observation openings in order to allow for the observation of the growth progress at any time, without changing the conditions within the device. The door can be equipped with an optionally tinted observation opening. In addition, the growth progress of the plants growing from the seeds is preferably recorded by at least one camera and the signals are forwarded to the program controller by a pattern detection device and an associated pattern detection memory. The pattern detection device may match both the plant condition and the growth progress by a pattern detection memory and to adjust thus the program controller to the respective plant and its condition.

Figure 1:
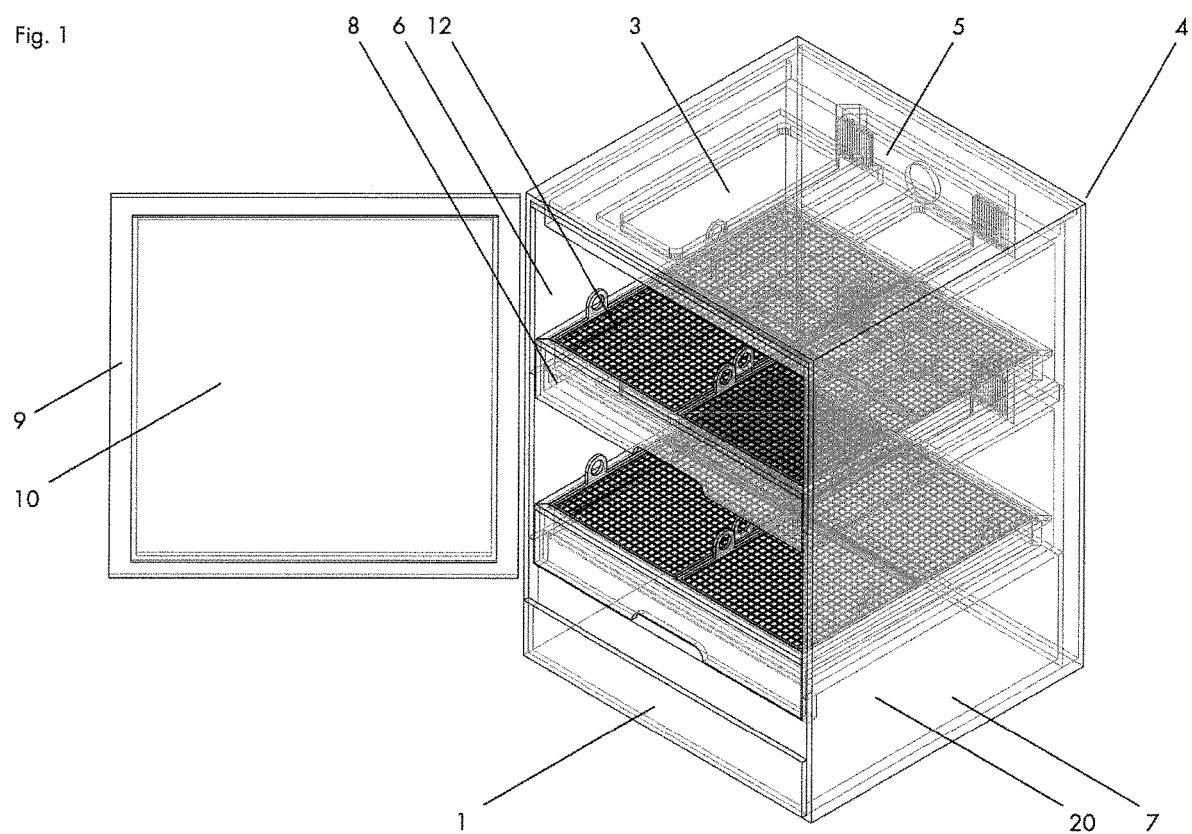
FIG. 1 shows a perspective view of a device according to the invention
Figure 2:
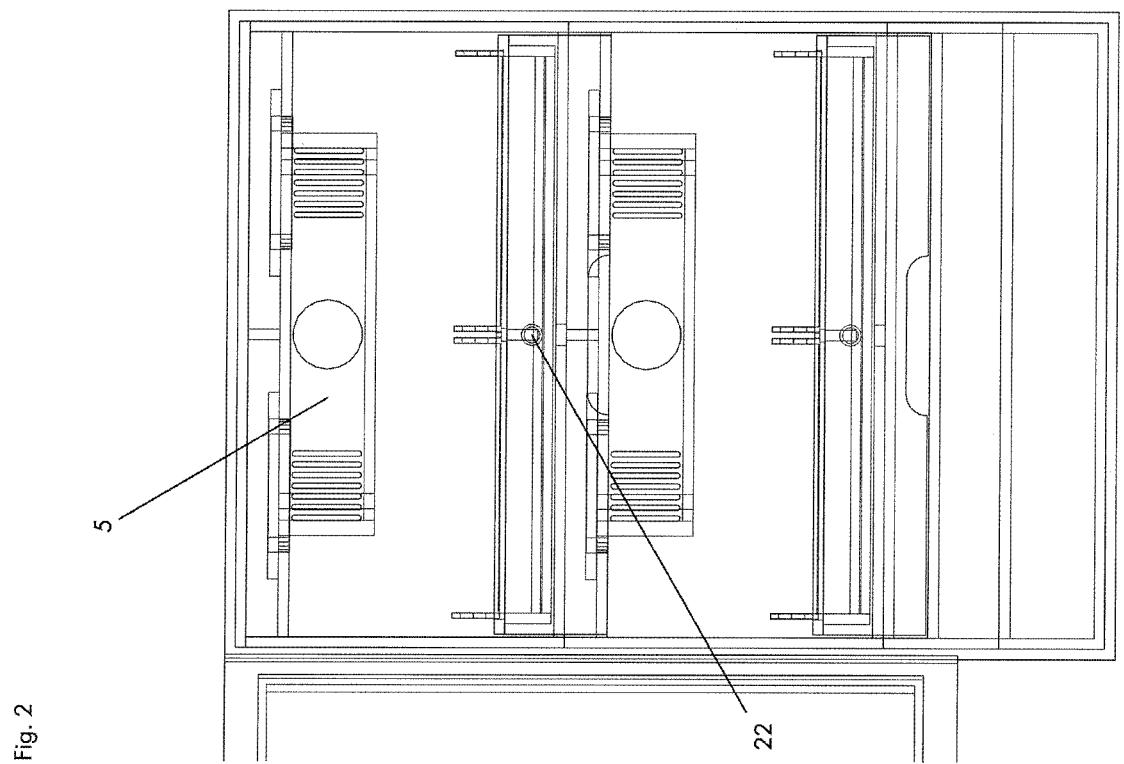
FIG. 2 shows a sectional view of the device in the longitudinal direction
Figure 3:
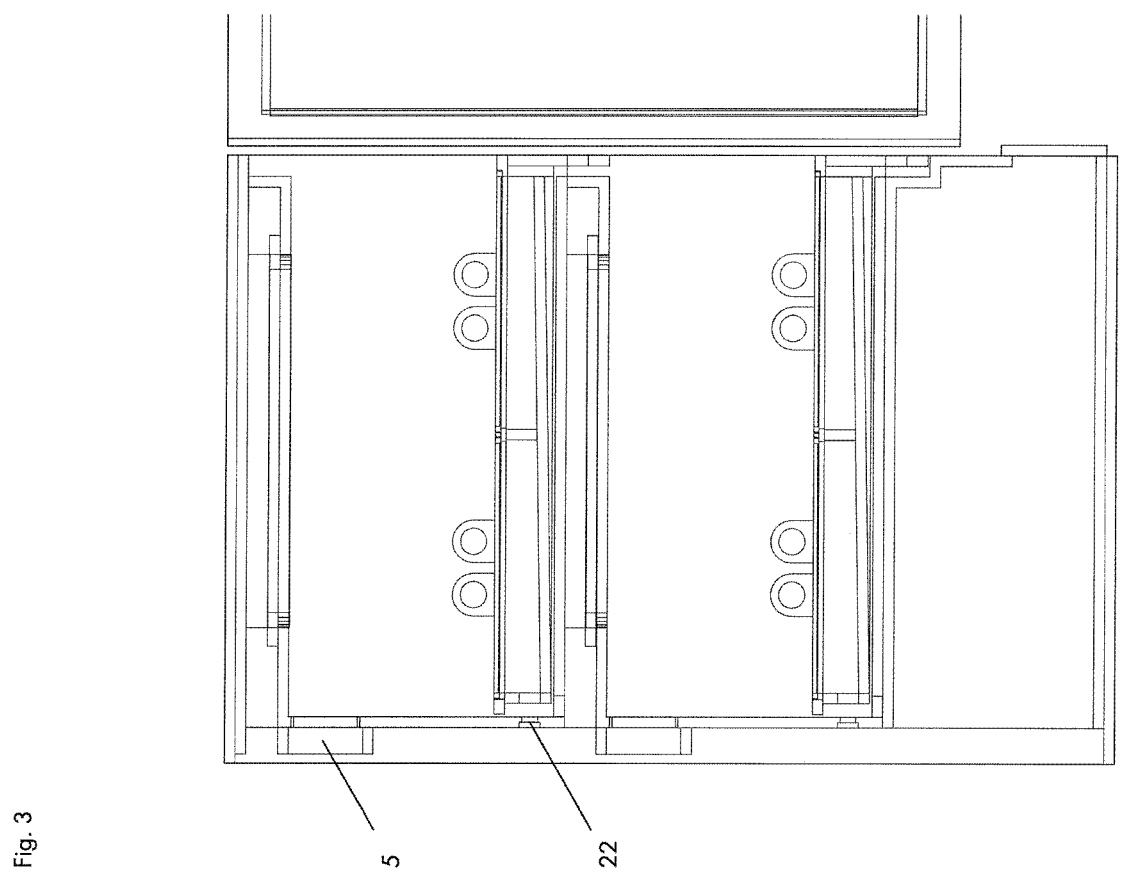
FIG. 3 shows a sectional view of the device in the transverse direction
Figure 4:
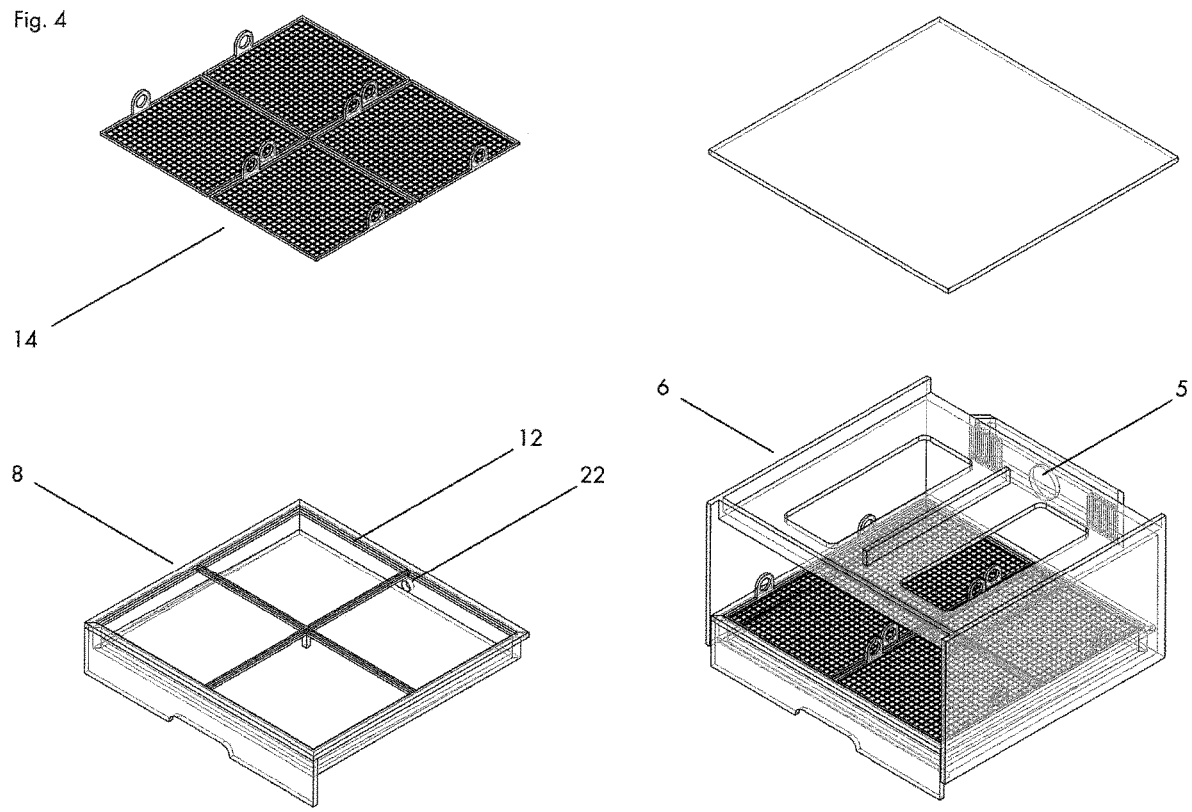
FIG. 4 shows an exploded view of the cultivating unit according to the invention of the device

At least one cultivating unit is arranged in the housing of the device. Each illuminating device with the mat support arranged below and watering trough arranged below form one cultivating unit. The watering trough with at least one mat support arranged above may be formed as a drawer unit. Preferably, at least two cultivating units are arranged in the device. A particular advantage is that several modular cultivating units in combination with a housing permit the arbitrarily expandable size of the device. Thus, the device may optionally be produced in the European kitchen base unit dimensions (90×60×60 cm), as shown in FIG. 1, as well as in the size of an American two-door refrigerator.

An illuminating device is arranged above every mat support. The illuminating device preferably consists of LEDs. The illuminating device is designed for optimal plant growth and is controllable via the control unit. The spectral range of the illuminating device is preferably in the range of 400 nm to 800 nm. The LEDs may preferably be controlled separately via four channels, wherein each of these channels provides a spectral range. The individual spectral range channels of the illuminating device are independently controllable/dimmable from 0 to 100 percent. The illumination duration and/or illumination intensity and/or the colour spectrum of the illumination unit are controllable by means of the control unit. The interior of the cultivating unit has a highest possible degree of reflection, preferably being white or reflective. The high degree of reflection of the interior and the optional inwardly reflecting tinting of the door ensure optimal light distribution within the device. All electrical wires and consumers are mounted in accordance with the VDE regulation for the electrification of furniture. A flexible, three-core line leads from the rear side, or optionally the side, of the device to connect the same to the power supply.

The plants are supplied with water by means of a hydroponic watering device. The water reservoir of the hydroponic watering device is located in the base of the device. There is at least one pump in the water reservoir. The pump transports the water from the water reservoir via at least one inlet into at least one water trough. A particular advantage is that at least one watering trough can be filled with water by each pump and the watering data can thus be optimised by means of the program controller of the respective sowing mat. The watering device can be flushed with liquid fertiliser or concentrated fertiliser but it is more cost-effective that the sowing mat includes the fertiliser. A drain filter is located on the drain openings of the individual watering troughs in order to prevent foreign matter entering the watering device.

The base of the device is closed and can be equipped with castors and/or feet. There are one, two, three or optionally four elements in the base of the device: a watering device and/or a climate control device and/or a control unit and/or an automated nutrient solution device. A particular advantage is that the castors and/or feet in the base are height-adjustable and thus allows for compensating unevenness of the ground, if necessary. In addition, the castors allow the device to be transported easily and the position of said device to be changed.

All joints of the device are water-tight and/or air-tight and/or splash-proof. Fresh air may only be intaken via the climate control device. The airflow into the interior of the device is designed such that all the internal air is regularly exchanged. Optimal supply with fresh air and/or a constant internal temperature and/or the optimal air humidity and/or the optimal CO2 content and/or the optimal O2 content and/or the optimal N2 content are guaranteed thereby. The supply air is intaken and filtered by the climate control device. The filter prevents the entry of insects into the interior of the device. The supply air filtered by the climate control device reaches the cultivating levels via air channels. The air circulation in the cultivating levels is between 0 and 2 m/s, preferably between 0.2 and 0.5 m/s. At the same time, the climate control device may control temperature and/or air humidity and/or carbon dioxide content and oxygen content and/or nitrogen content within the device. The exhaust air can preferably be directed outside through an activated carbon filter in order to avoid unpleasant odours. A particular advantage is that, by using the climate control device, the temperature and/or air humidity and/or carbon dioxide content of the air may optionally be adjusted for each cultivating unit by the program controller to match the respective programme of the respective seeds arranged in the cultivating unit and the current growth stage of the plants.

Sensors for measuring important values, which determine the plant growth (such as the pH value and/or the conductivity value and nutrient content in the water/nutrient solution and/or temperature and/or air humidity and/or nitrogen content and/or oxygen content and/or carbon dioxide content) are attached in the device and transmit the data to the control unit. All electrical lines of the sensors, illuminating device, climate control device, watering device and automated nutrient solution device end on the rear wall of the device in a water-repellant control unit. A control unit controls the actuators and regularly sends sensor data to an external data memory, preferably via an internet connection provided in the device. In the meantime, the sensor data may also be saved to a local data memory. The program controller data and sensor data may also be transmitted or read by means of a USB port or Ethernet cable.

A sowing mat with integrated seeds is separately or integrally stackable with a fertiliser mat. An RFID chip is provided on and/or in the sowing mat, preferably in a detachable manner, and/or a QR code and/or a barcode is attached thereto. Using the program sensor, which is preferably an RFID sensor and/or QR code sensor and/or barcode sensor, the individual data of the seeds may be transmitted to the program controller and the data memory. At least one sowing mat is connectable with a mat support. Preferably, four mat supports are used, but one or more mat supports may also be used. For the mat support, preferably two to four insert openings are provided. A particular advantage is that several sowing mats with different seeds can be fitted simultaneously into the device.

The program controller continuously determines temperature and/or air humidity and/or air circulation and/or carbon dioxide content and/or oxygen content and/or nitrogen content and/or watering cycle and/or pH value of the water and/or conductivity value of the water and/or illumination duration and/or illumination intensity and/or spectral range of the illumination based on the seeds recognised by the program sensor. A particular advantage is that, with the help of the program controller, individual and/or preferably several nutrient concentrations and/or flavour and/or texture and/or colouring of the plants and/or the growth speed and/or growth height and/or growth width may be controlled.

In particular, a fully automated and compact cultivating device may be created with the device according to the invention, with which the seeds may be cultivated without soil using a hydroponic method and preferably without influence of daylight until harvest without significant effort of the consumer and may be harvested when the plants are ripe. In this context, it is particularly important that the light which is important for germination and growth of the seeds and the young plants, respectively, does not pass or preferably only sparsely passes through the sowing mat, and thus, no growth of algae is stimulated in the watering trough arranged below, when the roots of the seedling get in touch with the water.

The dimensioning of the device may be implemented in a size which preferably has a shape of a built-in unit of a built-in kitchen. Furthermore, the device may be designed such that it is modularly extendable. Moreover, ideal growth conditions may also be provided during cultivation of the seeds over different stages of growth until harvesting, while at the same time using different variations of seeds of a plurality of plants at the same time per cultivating unit.

In a fully automatic, compact device, a closed system is produced providing ideal conditions allowing for an improved/accelerated plant growth. By providing an integrated illuminating device, the proportions of visible and invisible spectral ranges and/or specific wavelengths may be controlled according to the growth conditions to be optimized for the respective plants.

The watering system is controlled such that the plant growth of respective plants is controlled individually, preferably within the respective cultivating unit. Here, the water level may be lifted closer to the rooting area or also may be lowered according to the ideal growth situation of the plant.

The climate control device comprises heating elements, which preferably are implemented by the illuminating device, as well as a cooling element, which is configured to lower the temperature within the device and/or within each of the single cultivating units.

The pattern detection device may be configured to record optical and/or video signals and to match the same with stored pattern detection data. Thus, a particular advantage is that the progress in growth and the state of the plants may be observed at any time, even without being on the ground, if necessary, and without influencing the conditions within the device by opening an observation opening. The data delivered by the sensors may be transmitted to a database common to a plurality of devices via an Internet connection, and the data evaluated therefrom may be sent back to the control unit via this Internet connection.

By using sowing mats together with a composition of nutrients or concentration of nutrients adapted to the respective seeds, plants may be grown for consumption without applying pesticides and, also, with economic resource management by local production.

LIST OF REFERENCE SIGNS 1 base
2 seeds
3 illuminating device
4 housing
5 climate control device
6 cultivating unit
7 control unit
8 watering trough
9 door
10 observation opening
12 insert opening
14 mat support
16 sowing mat
17 seed support
18 fertiliser mat
20 watering device
22 water inlet/outlet

The invention claimed is:

1. Device for cultivating plants, including
a watering device;
an illuminating device;
a receiving space for accommodating one or more seed mats;
a control unit configured to control the watering device and the illuminating device by means of a program controller;
wherein the program controller comprises watering data and illuminating data which is individually matched to the one or more seed mats accommodated in the receiving space,
wherein the one or more seed mats include seeds,
wherein a growth progress of plants growing from the seeds is recorded by at least one camera, and signals are forwarded to the program controller by a pattern detection device and an associated pattern detection memory,
wherein the pattern detection device is configured to record optical and/or video signals and to match the same with stored pattern detection data, and
wherein the pattern detection device is further configured to match both the plant condition and the growth progress by the pattern detection memory and to adjust the program controller to the respective plant and its condition.

2. Device according to claim 1, further comprising:
sensors for measuring values which determine plant growth.

3. Device according to claim 1, wherein a mat support is provided which is formed in a shape of the one or more seed mats as a support for at least one seed mat and has openings for roots of the plants growing from the seeds.

4. Device according to claim 1, wherein the receiving space is configured to receive at least one panel which is arranged in the device and having corresponding recesses,
wherein each of the panels has two to four insert openings, into each of which a mat support is arranged by means of fitting and/or sliding and/or folding.

5. Device according to claim 4, wherein the illuminating device is arranged above each panel.

6. Device according to claim 1, wherein the spectral range emitted from the illuminating device is adjustable.

7. Device according to claim 1, wherein the watering device comprises a watering trough, above which the seed mats are arranged.

8. Device according to claim 7, wherein the watering trough includes a water inlet and/or a water outlet, wherein the water inlet and/or the water outlet is controllable.

9. Device according to claim 8, wherein the filling level of the watering trough is adjustable by means of the water inlet and/or water outlet.

10. Device according to claim 7, wherein each illuminating device together with the seed mat arranged below and the watering trough arranged below forms a cultivating unit.

11. Device according to claim 7, wherein the watering trough with at least one seed mat arranged above is formed as a drawer unit configured to be accommodated in the receiving space.

12. Device according to claim 7, wherein the watering device with the inlet and/or outlet of the watering trough is connectable by means of a plug-in connector.

13. Device according to claim 1, wherein at least one illuminating device is formed as a drawer unit including an electrical plug-in connector.

14. Device according to claim 1, wherein the control unit further is configured to control a climate control device by means of the program controller, wherein the program controller comprises climate control data which is individually matched to the one or more seed mats accommodated in the receiving space.

15. Device according to claim 1, wherein the device is configured to transmit data to and from a data memory provided for the program controller, from which data memory illumination data and/or watering data and/or climate control data matched individually to the seeds are retrieved.

16. Device according to claim 1, the device further including a program sensor, wherein the program sensor is provided as an RFID sensor and/or QR code sensor and/or barcode sensor, which can record RFID signals and a QR tag and a barcode, respectively, of at least one seed mat to control the program controller.

17. Device according to claim 16, wherein each of the one or more seed mats includes an RFID chip and/or a QR code and/or a barcode is attached thereto,
wherein the device is configured to transmit individual data of the seeds to the program controller and a data memory via the RFID sensor and QR code sensor and barcode sensor, respectively.

18. Method for cultivating plants, comprising:
providing a device according to claim 1;
depositing seeds on one or a plurality of seed mats;
accommodating the one or more seed mats in the receiving space;

controlling the watering device and the illuminating device by means of the program controller of the control unit, based on the watering data and illuminating data which is individually matched to the one or more seed mats accommodated in the receiving space, matching, by the pattern detection device, both the plant condition and the growth progress by the pattern detection memory; and adjusting the program controller to the respective plant and its condition.

19. Method for cultivating plants according to claim 18, further comprising:

measuring the values which determine plant growth by means of sensors.

20. Device according to claim 15, wherein the data memory is provided as an external data memory by means of an internet connection provided within the device.

* * * * *